United States Patent
Catz et al.

(10) Patent No.: US 12,381,847 B2
(45) Date of Patent: Aug. 5, 2025

(54) SECURE NETWORKING ENGINE FOR A SECURE NETWORKING SYSTEM

(71) Applicant: MICROSOFT TECHNOLOGY LICENSING, LLC, Redmond, WA (US)

(72) Inventors: Alon Catz, Tel Aviv (IL); Guy Lewin, New York, NY (US); Gal Luvton, Hadera (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 297 days.

(21) Appl. No.: 17/547,087

(22) Filed: Dec. 9, 2021

(65) Prior Publication Data

US 2023/0006968 A1 Jan. 5, 2023

Related U.S. Application Data

(60) Provisional application No. 63/217,192, filed on Jun. 30, 2021.

(51) Int. Cl.
*H04L 9/00* (2022.01)
*H04L 9/40* (2022.01)
(Continued)

(52) U.S. Cl.
CPC .......... *H04L 63/0236* (2013.01); *H04L 45/74* (2013.01); *H04L 61/2503* (2013.01);
(Continued)

(58) Field of Classification Search
CPC . H04L 63/0236; H04L 45/74; H04L 61/2503; H04L 61/5007; H04L 63/0263;
(Continued)

(56) References Cited

U.S. PATENT DOCUMENTS

2007/0258464 A1* 11/2007 Hall ............... H04L 12/2872
370/395.52
2014/0089661 A1 3/2014 Mahadik et al.
(Continued)

OTHER PUBLICATIONS

"International Search Report and Written Opinion Issued in PCT Application No. PCT/US2022/029694", Mailed Date: Aug. 25, 2022, 11 Pages.
(Continued)

*Primary Examiner* — Syed M Ahsan
(74) *Attorney, Agent, or Firm* — Shook, Hardy & Bacon L.L.P.

(57) ABSTRACT

Methods, systems, and computer storage media for providing a local protocol server associated with a secure networking engine that provides client-side forwarding in a secure networking system. The local protocol server (e.g., local TCP/UDP server)—on a client device—operates based on client-side forwarding operations that include: IP assignment, operating system (OS) routing, destination network address translation, and original destination retrieval to support accessing a network resource (e.g., socket connection) on the client device and support communications between client applications on the client device and the local protocol server on the same client device. In this way, the local protocol server supports communications of a diverse set of data traffic or network traffic (e.g., different types of cross-platform communications), where the diverse set of network traffic is initially communicated from a client application and processed for network security operations at the local protocol sever of within the same client device.

20 Claims, 9 Drawing Sheets

(51) Int. Cl.
  *H04L 45/74* (2022.01)
  *H04L 61/2503* (2022.01)
  *H04L 61/5007* (2022.01)
  *H04L 69/16* (2022.01)
(52) U.S. Cl.
  CPC ...... *H04L 61/5007* (2022.05); *H04L 63/0263* (2013.01); *H04L 69/16* (2013.01)
(58) Field of Classification Search
  CPC . H04L 69/16; H04L 61/4511; H04L 63/0209; H04L 61/2525
  See application file for complete search history.

(56) References Cited

U.S. PATENT DOCUMENTS

| | | | |
|---|---|---|---|
| 2016/0218977 A1 | 7/2016 | Lapidous | |
| 2018/0139175 A1 | 5/2018 | Parvanov et al. | |
| 2018/0295064 A1* | 10/2018 | Movsisyan | G06F 9/45558 |
| 2019/0297161 A1* | 9/2019 | Ayyadevara | H04L 67/563 |
| 2020/0007496 A1* | 1/2020 | Park | H04L 63/0407 |

OTHER PUBLICATIONS

"New SASE Report from Gartner", Retrieved From: https://start.paloaltonetworks.com/gartner-report-roadmap-for-sase-convergence.html, Retrieved on: Dec. 27, 2021, 1 Page.
"SASE: Secure Access Service Edge", Retrieved From: https://www.perimeter81.com/sase, Retrieved on: Dec. 27, 2021, 14 Pages.
"Secure Access Service Edge", Retrieved From: https://en.wikipedia.org/wiki/Secure_access_service_edge, Retrieved on: Dec. 27, 2021, 7 Pages.
"What is SASE?", Retrieved From: https://www.paloaltonetworks.com/cyberpedia/what-is-sase, Retrieved on: Dec. 27, 2021, 5 Pages.
Hamy, "OpenVPN—TCP or UDP Tunneling?", Retrieved From: https://hamy.io/post/0002/openvpn-tcp-or-udp-tunneling/, Jan. 18, 2019, 4 Pages.
Stodle, Daniel, "Ping Tunnel", Retrieved From: https://www.mit.edu/afs.new/sipb/user/golem/tmp/ptunnel-0.61.orig/web/, May 26, 2005, 6 Pages.
Zuk, Nir, "The Next Generation of Network Security is Cloud-Delivered", Retrieved From: https://www.paloaltonetworks.com/blog/2019/11/cloud-next-generation-network-security/, Nov. 6, 2019, 3 Pages.
Communication pursuant to Article 94(3) Received in European Patent Application No. 22731856.5, mailed on Nov. 19, 2024, 07 pages.
Su, et al.,"Mobile Communication with Virtual Network Address Translation", Computer Science, Engineering, Feb. 1, 2002, pp. 1-14.
Summons to attend oral proceedings pursuant to Rule 115(1) received in European Application No. 22731856.5, mailed on May 13, 2025, 7 pages.

* cited by examiner

SECURE NETWORKING ENGINE FOR A SECURE NETWORKING SYSTEM

CROSS-REFERENCE TO RELATED APPLICATIONS

This application claims priority of Provisional Application No. 63/217,192, filed Jun. 30, 2021, and entitled "Secure Networking Engine for A Secure Networking System", the entire contents of which is incorporated herein by reference in its entirety.

BACKGROUND

Users rely on networked communications between applications and services to accomplish computing tasks. Distributed computing systems host and support different types of applications and services in on-premise networks or wide-area networks (WAN). In particular, the distributed computing system can implement a secure access service edge (SASE)—such as a secure (cloud-based) networking system—to provide network and security. SASE can be provided as a cloud service to deliver secure, optimal and automated access to applications and workloads in the cloud. For example, an IoT device can be SASE compatible to provide increased security—via the cloud service—for communications between the IoT device and client applications.

Conventionally, secure networking systems are not configured with a comprehensive computing logic and infrastructure to efficiently provide secure network communications that are SASE compatible. Conventional secure networking systems use VPN (virtual private network) solutions for communications (e.g., cross-platform communications) based on communicating packets on an IP-basis. For example, a virtual network adapter can be configured to capture network traffic from a particular IP address and then communicate the network traffic to a network resource or endpoint. However, IP-based network processing does not support secure network communications functionality that is computing-resource efficient and that mitigates security risks. As such, a more comprehensive secure networking system—with an alternative basis for performing secure networking operations—can improve computing operations and interfaces in secure networking systems.

SUMMARY

Various aspects of the technology described herein are generally directed to systems, methods, and computer storage media for, among other things, providing a local protocol server associated with a secure networking engine that provides client-side forwarding in a secure networking system. The local protocol server (e.g., local TCP/UDP server)—on a client device—operates based on client-side forwarding operations that include: IP assignment, operating system (OS) routing, destination network address translation, and original destination retrieval to support accessing a network resource (e.g., socket connection) on a client device and support communications between client applications on the client device and the local protocol server on the client device.

Conventionally, secure networking systems are not configured with a comprehensive computing logic and infrastructure to efficiently provide secure network communications that are SASE compatible. A technical solution—to the limitations of conventional secure networking systems—a local protocol server associated with a secure networking engine that provides client-side forwarding in a secure networking system. In operation, the local protocol server—on a client device—listens for network connections and packet communications—in order to receive translated Internet Protocol (IP) packets with data that is processed for secure network communications via a SASE compatible model. Initially, a client application attempts to transmit data traffic to an intended destination IP address (e.g., MpApp: 80); however the data traffic is rerouted such that the client application communicates the data traffic (e.g., Transmission Control Protocol (TCP) synchronize (syn) packet) using an assigned IP address (e.g., secure networking engine proxy IP address). The assign IP address replaces the intended destination IP address (i.e., MyApp:80) of the client application. The assigned IP address can provided based on host name resolution IP assignment or hardcoded IP address IP assignment that replaces the original intended destination IP address of the client application with the assigned IP address. The assigned IP address allows the data traffic to be intercepted (e.g., via OS routing mechanism) and communicated to and via a packet interceptor device (e.g., a TUN device). The secure networking engine (e.g., via an agent) operates in a listening state to access the data traffic that is intercepted and communicated to the packet interceptor device. A destination network address translator—of the secure networking engine—accesses the data traffic from the packet interceptor device and translates the destination (i.e., executes a DNAT operation) of the data traffic (e.g., the TCP syn packet) to a constant local IP address and port (i.e., a client-side forwarding IP address and port) associated with the local protocol server.

The local protocol server operates in a listening state to access data associated with the translated IP packets via the destination address translator and an OS routing mechanism. In particular, based on the DNAT operation and translated destination network address, the OS routing mechanism forwards the data traffic to the local protocol server—via the client-side forwarding IP address and port—such that the local protocol server receives the translated IP packets. In this way, the local protocol server (e.g., TCP/UDP) is configured to receive data associated with the translated IP packets that originated from a client application on same client device.

The communication of the data of the translated IP packets is between the client application and the local protocol server both on the client device communicating via client-side forwarding operations including IP assignment, operating system (OS) routing, destination network address translation, and original destination retrieval. The local protocol server may establish a network connection based on translated IP packets. The local protocol server can be configured to support performing network security operations (e.g., authorizing, auditing, and securing access to network resources) for data traffic associated with the client applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Figure 1A:
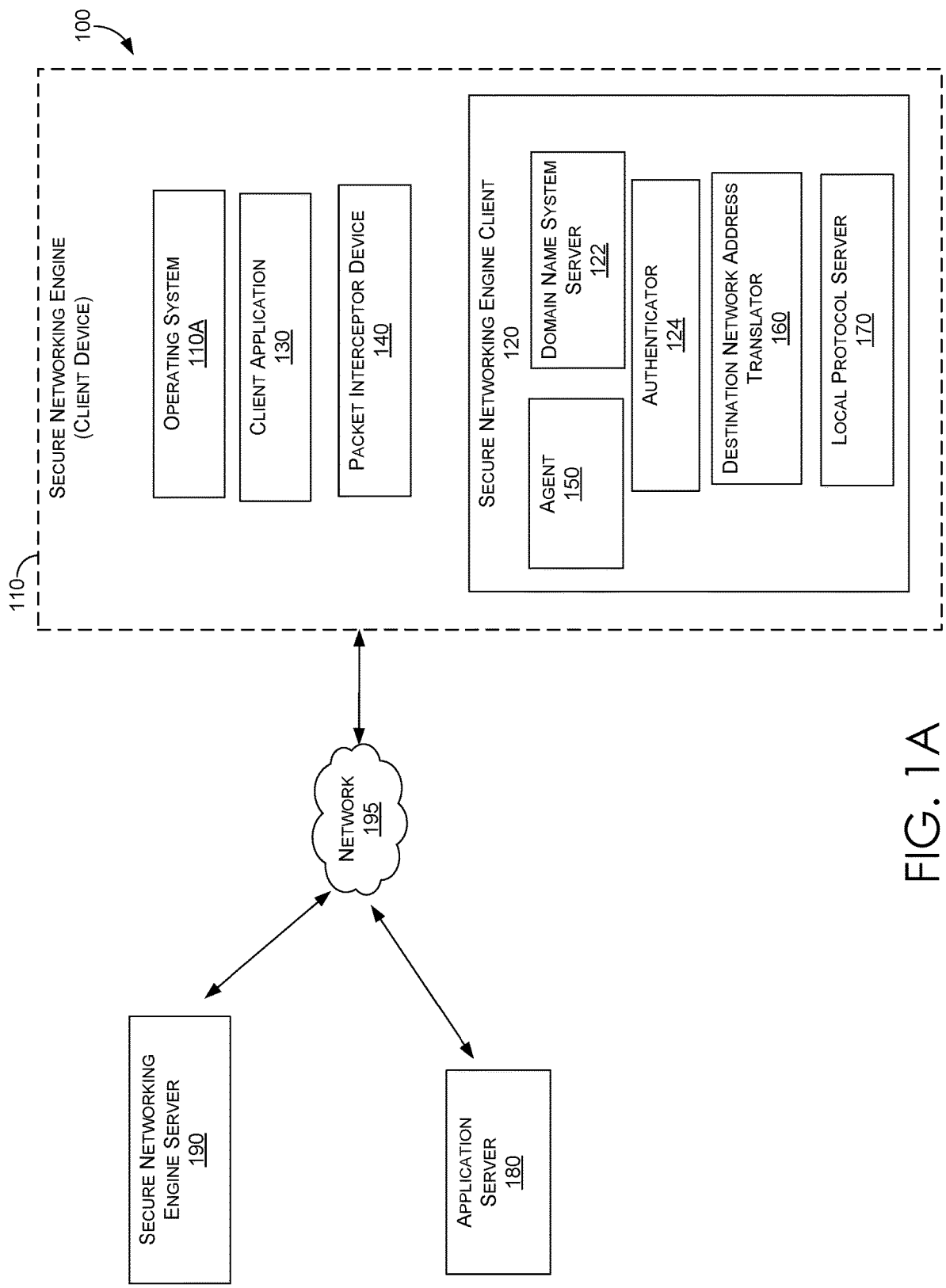
FIG. 1A is a block diagram of an exemplary secure networking system for providing a local protocol server that accesses data associated with a translated IP packet received via a packet interceptor device and destination network address translator of a secure networking engine, in accordance with aspects of the technology described herein.

Overview of Technical Problems, Technical Solutions, and Technological Improvements SASE is a networking and security model that supports providing networking and security both as a cloud service. SASE can be provided as a cloud service to deliver secure, optimal and automated access to applications and workloads in the cloud. For example, an IoT device can be SASE compatible to provide increased security—via the cloud service—for communications between the IoT device and client applications. Moreover, applications can operate based on firewall as a service (FWaaS), secure web gateway (SWG), zero-trust network access (ZTNA), and a medley of threat detection functions.

In some implementations, a source connection (e.g., user, device, IoT device, edge computing location) can be SASE compatible based on operating with a cloud service that implements networking and security directly with the source connection rather than a data center. For example, an edge device can be accessed based on a set of operations (e.g., authenticating, authorizing, and auditing) to provide improved security. In this way, the SASE model—via a secure networking system—provides secure access to network resources. SASE advantageously supports different types of network traffic including HTTP, FTP, and DNS.

Conventional secure networking systems use VPN (virtual private network) solutions for communication (e.g., cross-platform communications), where VPNs operate based on sending Internet Protocol (IP) packets on an IP-basis. VPN systems can be configured to force specific network connections to an identified network of an organization or to a separated network or sub-network. For example, a virtual network adapter can be configured to capture network data from an IP address and then communicate the network data to a network resource or endpoint. However, VPNs and VPN-type solutions are configured to intercept a defined scope of network traffic (e.g., workloads), which cannot be used to intercept a variety of different workloads.

A non-VPN solution can include developing a secure networking engine as a cloud service. As discussed herein, a cloud service solution can be implemented (e.g., parse network traffic centrally and route the network traffics based on predefined rules); however the cloud service solution can be computing-resource intensive and introduce security risks. In the cloud service solution implementation, a distributed computing system would incur additional computational costs for running a central server for receiving, parsing, and communicating data associated with processing the network traffic. In addition, parsing user data out of network connections (e.g., TCP or UPD) exposes the server to security risks. In this way, IP-based network processing and server-side security operations do not support secure network communications functionality that is computing-resource efficient and that mitigates security risks. As such, a more comprehensive secure networking system—with an alternative basis for performing secure networking operations—can improve computing operations and interfaces in secure networking systems.

Embodiments of the present disclosure are directed providing a local protocol server associated with a secure networking engine that provides client-side forwarding in a secure networking system. The local protocol server (e.g., local TCP/UDP server)—on a client device—operates based on client-side forwarding operations that include: IP assignment, operating system (OS) routing, destination network address translation, and original destination retrieval to support accessing a network resource (e.g., socket connection) on a client device and support communications between client applications on the client device and the local protocol server on the same client device. In this way, the local protocol server supports communications of a diverse set of network traffic (including cross-platform communications), where the diverse set of network traffic is initially communicated from a client application of a client device and processed for network security operations at the local protocol server of within the same client device.

Figure 1B:
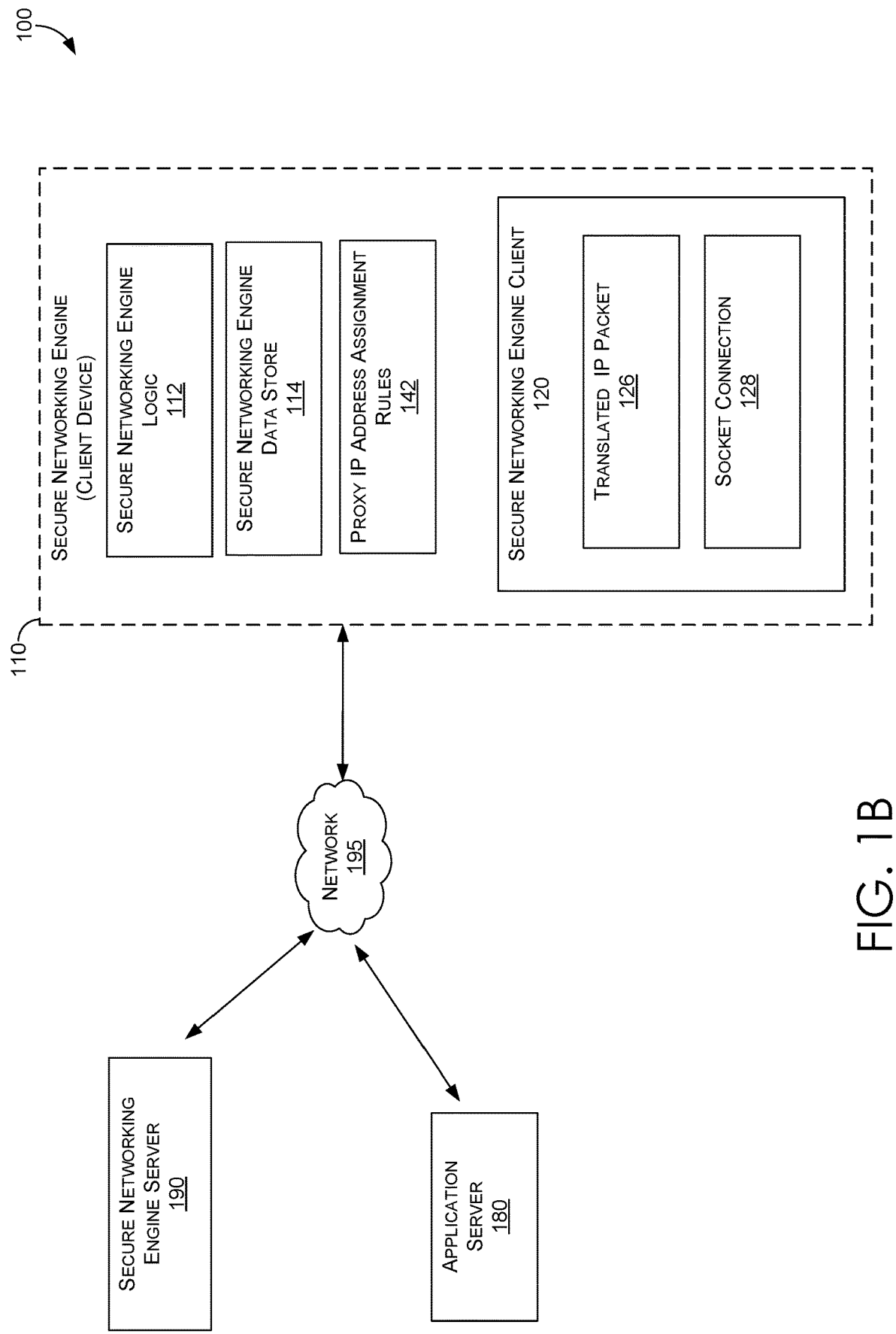
FIG. 1B is a block diagram of an exemplary schematic for providing a local protocol server that accesses data associated with a translated IP packet received via a packet interceptor device and destination network address translator of a secure networking engine, in accordance with aspects of the technology described herein.

Aspects of the technical solution can be described by way of examples and with reference to FIG. 1A, FIGS. 1B, and 1C. FIG. 1A illustrates a secure networking system 100 having a secure networking engine 110—including a secure network engine (client device) 110, operating system 110A, client application 130, packet interceptor device 140, agent 150, and secure networking engine client 120 including domain name system server 122, authenticator 124, destination network address translator, and local protocol server 170—an application server 180, a secure networking engine server 190, and network 195.

FIG. 1B illustrates the secure networking system 100 having the secure networking engine 110—including secure networking engine logic 112, secure networking engine data store 114, proxy IP address assignment rules 142—and secure networking engine client 120 including translated IP packet 126 and socket connection 128.

With embodiments described herein, a SASE model can be implemented in the secure networking system (e.g., secure networking system 100) that includes components that can intercept different types of data traffic or network traffic, where the data traffic is associated with an application server (e.g., application server 180) and a secure networking server (e.g., secure networking engine server 190). Application servers and secure networking servers can be network endpoints associated with the data traffic that is processed from the client application via the client device. Data traffic can generally refer to data that is encapsulated in network packets, where the data provides the load in the network. In particular, data traffic communicated from the different types of client applications can be intercepted using an OS routing mechanism (e.g., OS routing mechanism of Operating System 110A of FIG. 1A), packet interceptor device (e.g., packet interceptor 140), and a secure networking engine (e.g., secure networking engine—client device 110) in a secure networking system.

The secure networking engine performs client-side forwarding operations on the data traffic—after the data traffic has been intercepted and communicated to the packet interceptor device—where the client-side forwarding operations include a DNAT operation. The DNAT operation translates the destination address of the data traffic such that the data traffic is communicated to a local protocol server (e.g., local protocol server 170) that facilitates network security operations (e.g., SASE compatible network security operations). Network security operations can include authorizing, auditing, and securing access to network resources (e.g., non-client-side network resources) based on specific rules. The secure networking system can perform IP assignment, operating system (OS) routing, destination network address translation, and original destination retrieval associated with characteristics of the data traffic. The data traffic can advantageously be cross-platform data traffic which can be evaluated based on platform-specific characteristics to perform the network security operations.

The secure networking system manages different types of data traffic differently to provide network security operations in a distributed computing environment. For example, the data traffic can be internet data traffic and on-premise data traffic where network security operations are performed based on the characteristics of the internet data traffic and the on-premise data traffic. The network security operations can be associated with routing rules that correspond to the internet data traffic or the on-premise data traffic. For example, internet data traffic can be associated with WAN rules and internet protocols that correspond to HTTP or HTTPs calls and performing corresponding network security operations that apply limitations on domains that can be browsed and other types of web browsing limitations. With reference to the on-premise data traffic, firstly, the on-premise data traffic can be associated with LAN rules and custom protocols of on-premise applications—that correspond to backend workloads and calls—and secondly, on-premise traffic can be associated with performing network security operations that apply limitations associated with on-premise applications (e.g., database applications and custom applications).

As previously discussed, a cloud server-based secure networking engine implementation can be complicated or complex to implement and also expose a computing environment (e.g., a distributed computing environment) to security risks. At a high level, a cloud server implementation would have to include a costly or computing-resource intensive implementation of TCP/IP stack that parses and extracts data to inspect the data for performing network security operations. Moreover, parsing user-crafted data packets at the data layer in this manner can expose the computing environment to network security vulnerabilities including IP fragmentation and TCP fragmentation. As such, the technical solution described herein, can be a client-side implementation that avoids the computing-resource inefficiencies and the security risks associated with a cloud server implementation.

Accordingly, by way of illustration, the secure networking system can include support for intercepting data traffic and extracting TCP or UDP data, modifying the TCP or UDP data for client-side forwarding of the data traffic, and performing network security operations (e.g., authorizing, auditing, and securing access to network resources). Data traffic can be forwarded to a local protocol server (e.g., TCP/UDP server) via an operating system routing mechanism (e.g., kernel routing functionality), agent (i.e., secure networking engine client), a packet interceptor device (i.e., network layer device and data-traffic-intercept destination), and destination network address translation (DNAT) operations.

By way of example, a first client application (e.g., client application 130) of a plurality of client applications—on a client device—can establish a network connection and communicate a data packet based on client-side forwarding operations performed on the client device. The first client application can be a client application with a first type of data traffic and the plurality of client applications can have different types of data traffic. Data traffic can include internet data traffic for web browsing or data traffic can include email, social networking, database, and other types of application data traffic. The first client application—operationally—may be performing a process on the client device that is associated with a network connection to a socket (i.e., endpoint with an address) for a network resource (e.g., internet network resource or on-premise network resource).

As described in more detail herein, the first client application issues data traffic (e.g., data packet) to an assigned IP address (e.g., secure networking engine proxy IP address). The assigned IP address can be referred to as an intercept-IP-address that is associated with the packet interceptor device (e.g., a TUN interface of a TUN device). The assigned IP address can be assigned to a client application using several different methods based on rules (e.g., proxy IP address assignment rules 142) that indicate how to provide assigned IP address based on the attributes of the client application request. IP assignment operations are included in client-side forwarding operations to support intercepting data traffic from the client application and communicating the data traffic to the packet interceptor device. In other words, the secure networking system performs client-side forwarding operations that include, firstly, forcing the first client application to issue data traffic to the assigned IP address. Because the data traffic is issued to the assigned IP address, a data packet of the data traffic can be intercepted. Forcing the first client application to issue the data traffic to the assigned IP address can further be based on a range of assigned IP addresses associated with the packet interceptor device. In this way, any data traffic communicated to the assigned IP address (or range of IP assigned addresses) can be intercepted and communicated to the packet interceptor device.

In one embodiment, forcing the first client application to issue the data traffic using the assigned IP address is based on host name resolution operations. In this way, client-side forwarding operations can include host name resolution operations that force the first client application to issue the data traffic using the assigned IP address. In particular, with host name resolution operations—whenever the first client application attempts to resolve a host name—the assigned IP address is communicated instead, to facilitate intercepting the data traffic. The host name resolution operations are performed in advance—via a DNS server as discussed in detail below—to resolve a host name associated with the first client application to the assigned IP address.

Operationally, a DNS server (e.g., local or remote DNS server) is used to support host name resolution. For example, the plurality of client applications on the client device—including the first client application—have access to the DNS server, where the DNS server is associated with Name Resolution Policy Table (NRPT) rules (i.e., proxy IP address assignment rules 142) for policy-based name resolution request routing. For example, specific host names or wild card host names can be set up with rules to route the host names to assigned IP addresses. As such, DNS lookups can be routed to the DNS server to override any specific domains such that client applications communicate via assigned IP addresses.

It is also contemplated that host names that resolve to the same eventual destination IP address can be managed differently with regard with network security operations, as such, the host name resolution operations include methods for distinguishing the original host names. For example, a first host name A and a second host name B may both resolve to the same host name destination IP address; however, the routing evaluation, applicable policies, and session context for host name A and host name B may be different. As such, the host name resolution operations (e.g., via proxy IP address assignment rules 142) can include allocating IP addresses for different host names. For example, host name A can be allocated a first allocated IP address and host name B can be allocated a second allocated IP address. In operation, when the first client application communicates via host name A, the data traffic can be intercepted via the first allocated IP address and when the first application client application communicates via host name B, the data traffic can be intercepted via the second allocated IP address. And, based on the first allocated IP address or the second allocated IP address, network security operations are performed differently even though host name A and host name B resolve to the same eventual destination IP address.

Moreover, in some embodiments, a first client application may be configured to communicate via a hardcoded IP address instead of host name resolution. For example, the first client application may attempt to establish a socket connection that is not directed to a host name, but rather a hardcoded IP address. When a hardcoded IP address is associated with a client application, a routing rule can be created such that the operating system routing mechanism routes the hardcoded IP address to the packet interceptor device. Other variations and combinations of client-side forwarding operations—associated with proxy IP address assignment rules—for forcing client application to communicate via an assigned IP address such that the data traffic that is intercepted for processing via a packet interceptor device are contemplated with embodiment described herein.

As discussed, the assigned IP address is configured to force data traffic to a packet interceptor device that intercepts the data traffic such that the secure networking engine client (e.g., via an agent) listens to the incoming data traffic. The packet interceptor device refers to a kernel virtual network device that implements a virtual network card associated with a packet interceptor interface (e.g., TUN interface of a TUN device). The packet interceptor device is assigned a local IP address (i.e., packet interceptor device local IP address) of the client device. The packet interceptor device local IP address is used by the OS routing mechanism to communicate data traffic to the packet interceptor device. As assigned IP addresses are provided for first client application data traffic—based on proxy IP address assignment rules associated with host name resolution operations (i.e., DNS-based IP assignment, allocated IP addresses assignment) or hardcoded IP addresses operations (hardcoded IP address reassignment)—the packet interceptor device is also associated with the assigned IP addresses such that data traffic directed to the assigned IP addresses are communicated to the packet interceptor device. The packet interceptor device can be associated with a range of IP addresses of a subnet mask, where the assigned IP addresses correspond to the range of IP addresses. The packet interceptor device can intercept data traffic and trigger communication with a software application (e.g., secure networking engine 120 with agent 120A) of a client device instead of a hardware component.

When data traffic is received at the packet interceptor device, the agent (e.g., agent 150 of FIG. 1A) can listen for the data traffic to trigger additional client-side forwarding operations. The packet interceptor device operates as a bridge between the first client application routing and the agent. The agent can operate in a listening state to read data traffic from the packet interceptor device. For example, the first client application attempts to connect (i.e., set up a socket connection) to a network resource at a defined port (e.g., MyApp:80) and based on IP assignment operations MyApp:80 is assigned an assigned IP address 1.1.1.2:80 (e.g., via host name resolution). The DNS server stores the mapping between MyApp:80 and 1.1.1.2:80.

In operation, the first application client can communicate a packet to establish a connection through TCP, UDP, or other types of connection. For example, a TCP connection can be established via a three-way handshake TCP/IP network creation mechanism ("three-way handshake"), the three-way handshake can be used to establish a network connection (e.g., network TCP socket connection) with a remote server. The three-way handshake can include initiating and negotiating parameters of the network TCP socket connection. The first application client can communicate a TCP syn packet via the assigned IP address (e.g., 1.1.1.2:80) where the TCP syn packet is intercepted by the packet interceptor device because the OS routing mechanism is configured to transmit communications from the assigned IP address to the packet interceptor device.

It is contemplated that the agent can support authentication operations using a socket table that tracks previously authenticated socket connections and based on retrieving the original intended destination (i.e., original destination data) of the data traffic. The agent may access a table of existing socket connections to bypass authentication for any previously authenticated socket connections. The agent can cause an authenticator (e.g., authenticator 124) to authenticate and store new authenticated socket connections in the socket table. New socket connections that are not authenticated can be authenticated via an identity provider (e.g., active directory). Authentication operations associated with an assigned IP address include retrieving the original destination data from the DNS server. For example, the DNS server stores mappings of original destination IP addresses to host name resolution assigned IP addresses. As such, with reference to assigned IP address 1.1.1.2:80, the authentication operation includes retrieving MyApp:80 via the "MyApp:80 to 1.1.1.2:80" mapping in DNS, in order to authenticate the MyApp socket connection request.

Embodiments described herein further include the securing networking engine client performing client-side forwarding operations to configure socket connections to a local protocol server (e.g., local TCP/UDP server) that operates on the same client device that originated the request to access a socket connection. Conventionally, applications access socket connections to connect to remote endpoints. However, with the client-side forwarding operations including IP assignment, OS routing, packet interception, and destination network address translation (DNAT), such that a client application request to access a socket connection (e.g., creates a new network connection) via the local protocol server. The local protocol server operates based on application or socket layer protocols; however, has access to IP layer information that has been extracted and stored (e.g., via DNS server, DNAT and OS routing mechanism) prior to the OS routing mechanism communicating data (i.e., the application layer data) to the local protocol server.

By way of illustration, destination network address translation (DNAT) includes changing the destination IP address of a packet of the data traffic. For example, the destination network address of the TCP/IP syn packet is translated to a constant local IP address and port (i.e., client-side forwarding IP address and port). The client-side forwarding IP address and port are associated with a local protocol server (e.g., local TCP/UDP server) that operates on the transport layer. The local TCP/UDP server operates in a listening state to receive requests for socket connections. Based on the DNAT, the operating system routing mechanism forwards the data associated with the TCP/IP syn packet (e.g., translated packet 126) to the local TCP/UDP server that establishes the socket connection (e.g., socket connection 128).

The client application accessing the socket connection can include the local TCP/UDP server creating a network connection based on communicating a TCP/IP acknowledgment (ack) packet as part of the three-way handshake. In this way, as part of DNAT, multiple network connection requests with different corresponding ports (e.g., network connect request 1:80, network connection request 2:23, network connection request 3:90) can be translated via DNAT to the same client-side forward IP address/port.

It is contemplated that the original intended destination (e.g., original destination data) for packets associated with the first client application can be retrieved. In one embodiment, the secure networking engine can utilize an OS socket API that allows the secure networking engine access to the source port of IP packets that are translated into translated IP packets. Upon identifying the source port, the secure networking engine relies on computing logic (e.g., secure networking engine logic 112) for maintaining the original destination data (e.g., in-memory or a source port table) such that the original destination data can be accessed based the source port via the socket API.

By way of example, MyApp:80 was mapped to assigned IP address: 1.1.1.2:80 and then 1.1.1.2:80 was translated to the client-side forwarding IP address and port, thus losing the original destination information. However, during DNAT, the source port remains unchanged, and the source port for DNAT operations can be tracked (e.g., in-memory or a source port table). For example, the source port table can include a mapping between the source port and assigned IP address. As such the original destination can data can be retrieved using the source port table, wherein the source port of the 1.1.1.2:80 IP address—associated with DNAT—can be used to map back to 1.1.1.2:80 and further MyApp:80 (e.g., via DNS) and the original destination data for the MyApp:80 data traffic.

Figure 2A:
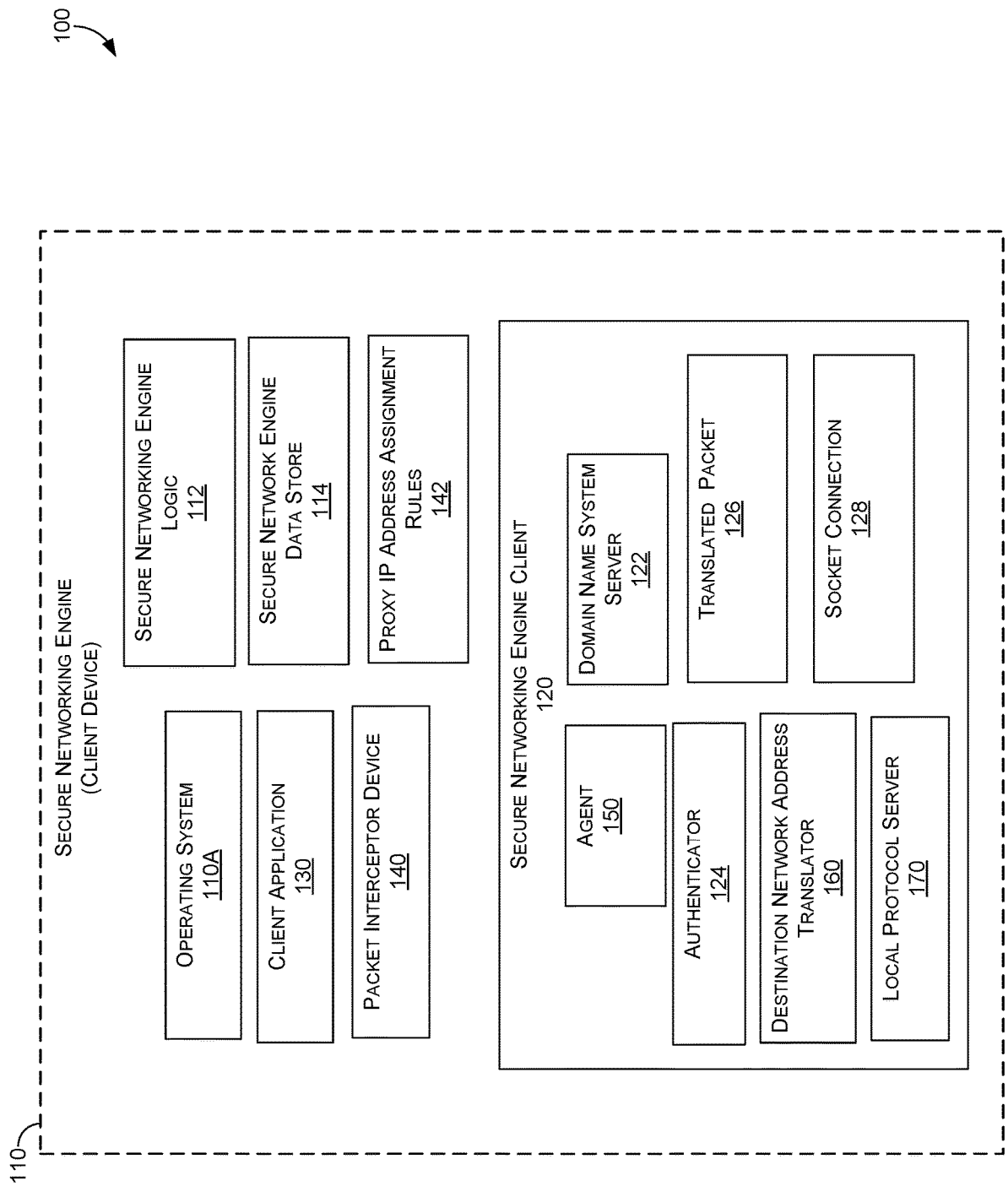
FIG. 2A is an exemplary secure networking system for providing a local protocol server that accesses data associated with a translated IP packet received via a packet interceptor device and destination network address translator of a secure networking engine, in accordance with aspects of the technology described herein.
Figure 2B:
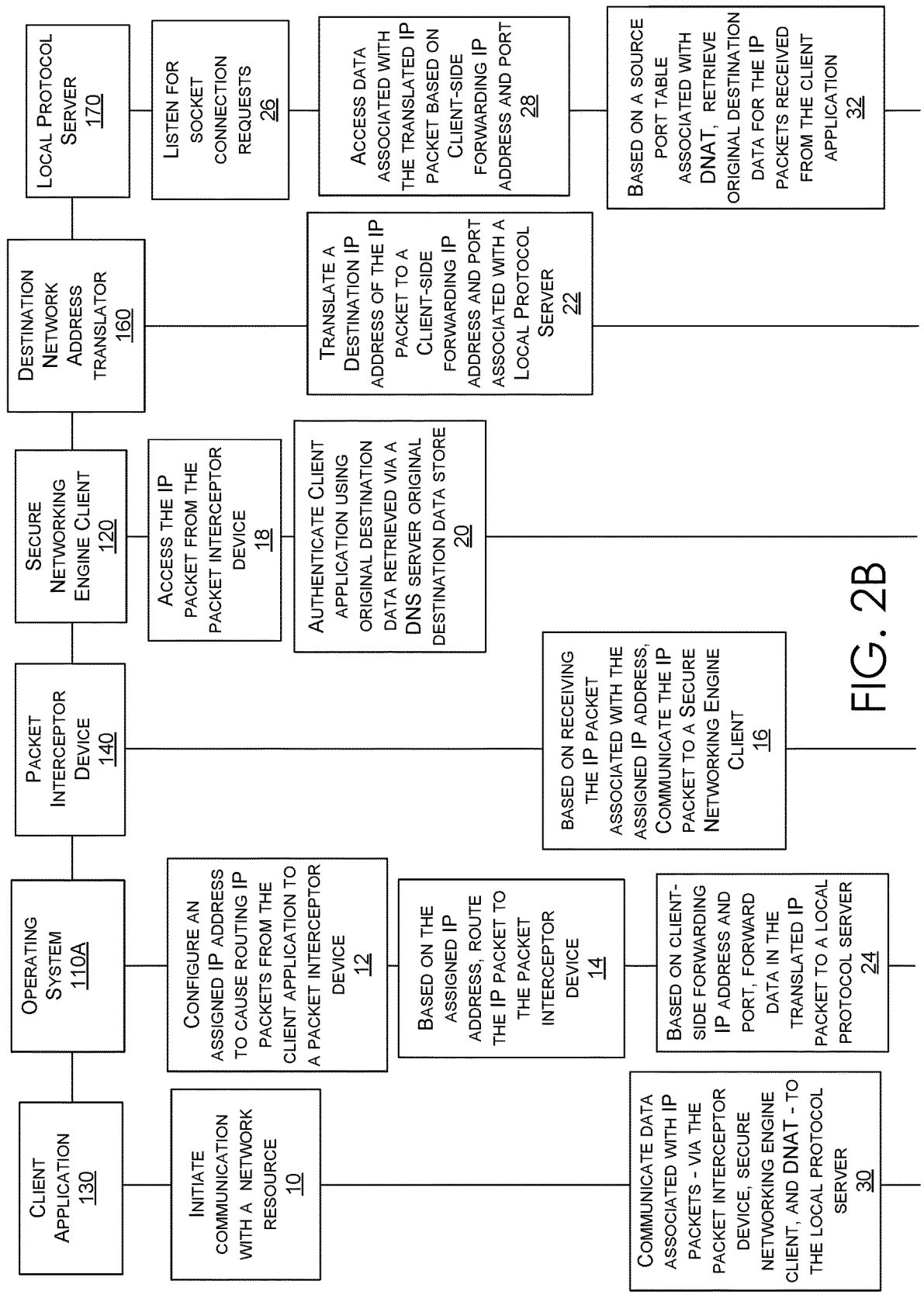
FIG. 2B is a block diagram of an exemplary schematic for providing a local protocol server that accesses data associated with a translated IP packet received via a packet interceptor device and destination network address translator of a secure networking engine, in accordance with aspects of the technology described herein.

Overview of Exemplary Environments for Client-Side Forwarding Associated with a Local Protocol Server of a Secure Networking System Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example secure networking system 100 in which methods of the present disclosure may be employed. In particular, FIG. 2A shows a high level architecture of the secure networking system 100 in accordance with implementations of the present disclosure. Among other engines, managers, generators, selectors, or components not shown (collectively referred to herein as "components"), the technical solution environment of secure networking system 100 includes secure networking engine 110, operating system 110A, secure networking engine client 120, client application 130, packet interceptor device 140, agent 150, domain name system server 122, authenticator 124, destination network address translator 160, and local protocol server 170. The secure networking engine 110 further includes secure networking engine logic 112, secure networking engine data store 114, proxy IP address assignment rules 142—and secure networking engine client 120 including translated IP packet 126 and socket connection 128.

With reference to FIG. 1, initially, at block 10, client application 130 initiates communication with a network resource. For example, the client application 130 may initiate generation of a network connection (e.g., a TCP/IP network connection) or initiate communication with a socket. The client application 130 may generate a data traffic (e.g., IP packet) that includes instructions on how to access or establish a connection with a network resource. At block 12, the operating system 110A (e.g., via an OS routing mechanism) configures an assigned IP address to cause routing IP packets from the client application to a packet interceptor device. The secure networking engine can secure networking engine logic 112, secure networking engine data store 114, and proxy IP address assignment rules that support assigning assigned IP addresses to client applications attempting to access a network resource. The plurality of proxy IP address assignment rules 142 associated with host name resolution, hardcoded IP addresses, allocated IP addresses can instruct on assigning assigned IP addresses to client applications.

At block 14, based on the assigned IP address, the operating system routing mechanism can route the IP packet to the packet interceptor device 140. The packet interceptor device 140 is associated with assigned IP addresses such that data traffic from the client application 130 At block 16, based on receiving the IP packet associated with the assigned IP packet address, the packet interceptor device 140 communicates the IP packet to a secure network engine client 120. At block 18, the secure networking engine client 120 accesses the IP packet from the packet interceptor device. At block 20, the secure networking engine client 120 authenticates the client application using original destination retrieved via a DNS server original destination data store (e.g., secure network engine data store 114).

At block 22, the DNAT 160 translates a destination IP address of the IP packet to a client-side forwarding IP address and port are associated with a local protocol server. At block 24, based on the client-side forwarding IP address and port, the operating system routing mechanism forwards data associated with translated IP packet to a local protocol server. At block 26, the local protocol server 170 listens for socket connection requests. At block 28, the local protocol server accesses data the translated IP packet from the client application based on the client-side forwarding IP address and port. At block 30, the client application operates to communicate data associated with IP packets—via the packet interceptor device, secure networking engine client, and DNAT—to the local protocol server. At block 32, based in part on a source port table associated with DNAT, the local protocol server retrieves original destination data for the IP packets received from the client application 130.

Figure 3:
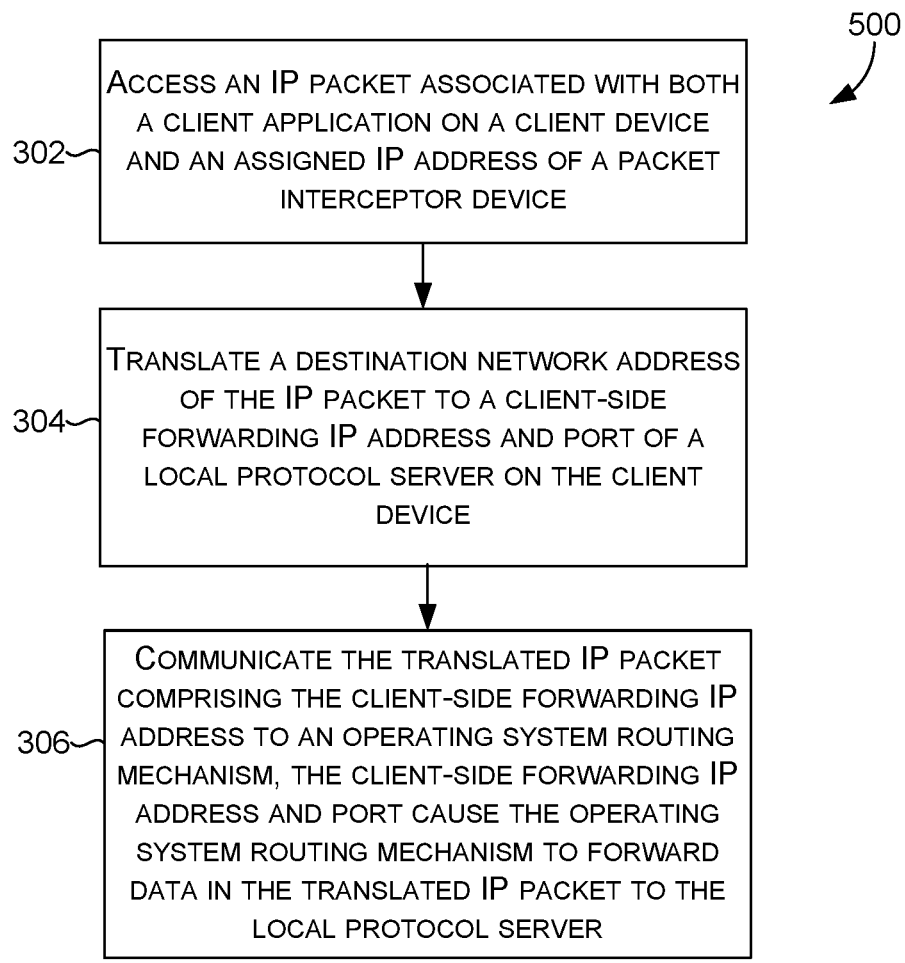
FIG. 3 provides a first exemplary method of providing a local protocol server that accesses data associated with a translated IP packet received via a packet interceptor device and destination network address translator of a secure networking engine, in accordance with aspects of the technology described herein.
Figure 4:
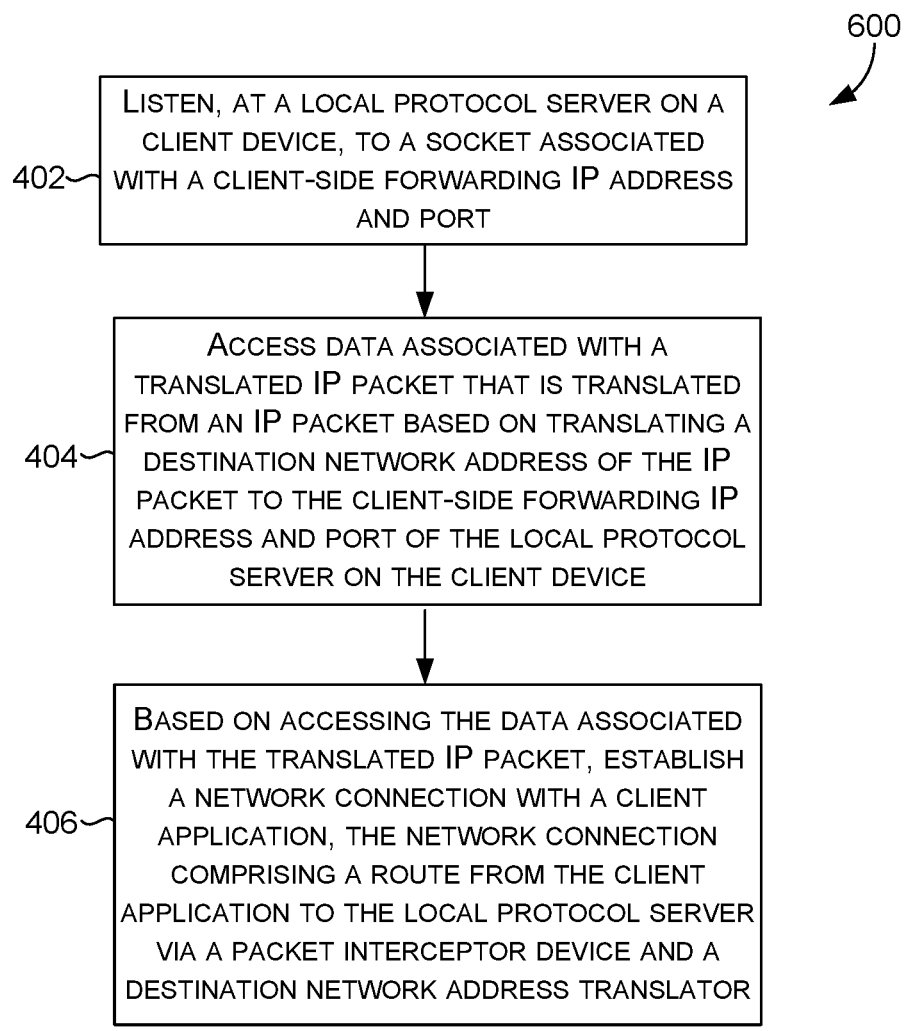
FIG. 4 provides a second exemplary method of providing a local protocol server that accesses data associated with a translated IP packet received via a packet interceptor device and destination network address translator of a secure networking engine, in accordance with aspects of the technology described herein.
Figure 5:
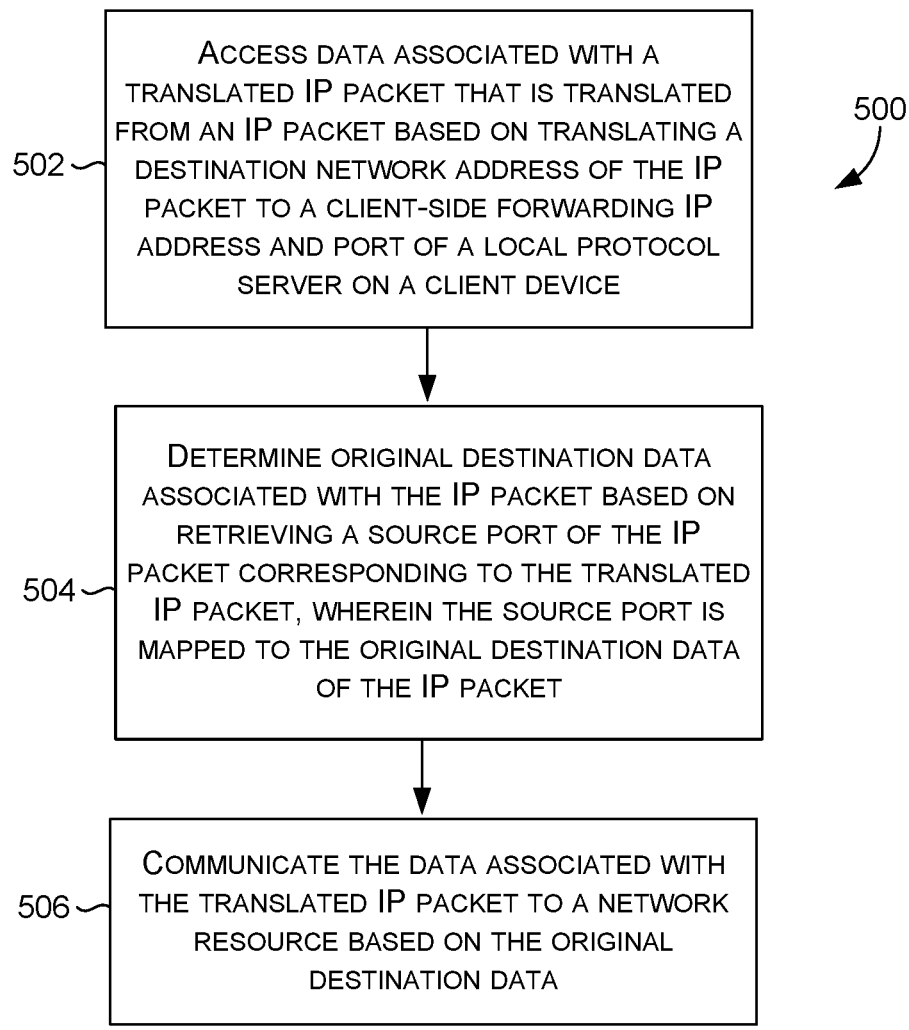
FIG. 5 provides a third exemplary method of providing a local protocol server that accesses data associated with a translated IP packet received via a packet interceptor device and destination network address translator of a secure networking engine, in accordance with aspects of the technology described herein.

Exemplary Methods for Providing Client-Side Forwarding Associated with a Local Protocol Server of a Secure Networking System With reference to FIGS. 3, 4, and 5, flow diagrams are provided illustrating methods for providing a local protocol server on a client device associated with a secure networking engine that provides client-side forwarding in a secure networking system. The methods may be performed using the secure networking system described herein. In embodiments, one or more computer-storage media having computer-executable or computer-useable instructions embodied thereon that, when executed, by one or more processors can cause the one or more processors to perform the methods (e.g., computer-implemented method) in the secure networking system (e.g., a computerized system or computing system).

Turning to FIG. 3, a flow diagram is provided that illustrates a method 300 for a local protocol server on a client device associated with a secure networking engine that provides client-side forwarding in a secure networking system. At block 302, an IP packet associated with both a client application on a client device and an assigned IP address of a packet interceptor device is accessed. The packet interceptor device is configured to receive IP packets that are intercepted based on a plurality of assigned IP addresses that cause intercepting the IP packets and routing the IP packets to the packet interceptor device. A plurality of proxy IP address assignment rules associated with host name resolution, hardcoded IP addresses, allocated IP addresses that instruct on assigning assigned IP addresses to client applications attempting to connect to a network resource.

At block 304, a destination network address of the IP packet is translated to a client-side forwarding IP address and port of a local protocol server of the client device. The local protocol server comprises a socket associated with the client-side forwarding IP address and port. The local protocol server is configured to listen via the socket; access the data associated with the translated IP packet; and based on accessing the data associated with the translated IP packet, establish a network connection with the client application, the network connection comprising a route from the client application to the local protocol server via the packet interceptor device and a destination network address translator, wherein establishing the network connection comprises the local protocol server and the client application performing a Transmission Control Protocol (TCP) three-way handshake. A synchronize/acknowledgement communication from the local protocol server and an acknowledgement communication from the client application are communicated via the packet interceptor device and the destination network address translator during the TCP three-way handshake to establish a network connection between the client application and the local protocol server. The local protocol server is further configured to retrieve a source port of the translated IP packet. The source port is mapped to the original destination data of the IP packet.

At block 306, the translated IP packet comprising the client-side forwarding IP address is communicated to an operating system routing mechanism. The client-side forwarding IP address and port cause the operating system routing mechanism to forward data associated with the translated IP packet to the local protocol server. The operating system routing mechanism is configured to: route the IP packet to the packet interceptor device based on the assigned IP address; and communicate data associated with the translated IP packet to the local protocol sever based on the client-side forwarding IP address and port.

Turning to FIG. 4, a flow diagram is provided that illustrates a method 400 for a local protocol server on a client device associated with a secure networking engine that provides client-side forwarding in a secure networking system. At block 402, a local protocol server listens to a socket associated with a client-side forwarding IP address and port. At block 404, data associated with a translated IP packet—that is translated from an IP packet based on translating a destination network address of the IP packet to a client-side forwarding IP address and port of the local protocol server—is accessed. At 406, based on accessing the data associated with the translated IP packet, a network connection is established with a client application. The network connection comprises a route from the client application to the local protocol sever via packet interceptor device and a destination network address translator.

Turning to FIG. 5, a flow diagram is provided that illustrates a method 500 for a local protocol server on a client device associated with a secure networking engine that provides client-side forwarding in a secure networking system. At block 502, data associated with a translated IP packet—that is translated from an IP packet based on translating a destination network address of the IP packet to a client-side forwarding IP address and port of the local protocol server—is accessed. At block 504, an original destination data associated with the IP packet is determined based on retrieving a source port of the IP packet corresponding to the translated IP packet. The source port is mapped to the original destination data of the IP packet. At block 506, the data associated with the translated IP packet is communicated to a network resource based on the original destination data.

Technical Improvement and Literal Support for Claims

Embodiments of the present invention have been described with reference to several inventive features (e.g., operations, systems, engines, and components) associated with a secure networking system. Inventive features described include: operations, interfaces, data structures, and arrangements of computing resources associated with providing the functionality described herein relative with reference to a secure networking engine. Functionality of the embodiments of the present invention have further been described, by way of an implementation and anecdotal examples—to demonstrate that the operations for providing the local protocol server as a solution to a specific problem in secure networking technology to improve computing operations in secure networking systems. Overall, these improvements result in less CPU computation, smaller memory requirements, and increased flexibility in secure networking systems when compared to previous conventional secure networking system operations performed for similar functionality.

The improvements of the secure networking system are associated with a computer-implemented method comprising: accessing, at a destination network address translator on a client device, an Internet Protocol (IP) packet from a packet interceptor device, the IP packet is associated with both a client application on the client device and an assigned IP address of the packet interceptor device; translating a destination network address of the IP packet to a client-side forwarding IP address and port of a local protocol server on the client device; and communicating the translated IP packet comprising the client-side forwarding IP address and port to an operating system routing mechanism, the client-side forwarding IP address and port cause the operating system routing mechanism to forward data associated with the translated IP packet to the local protocol server. The IP packet is received at the packet interceptor device based on the assigned IP address associated with the client application that causes the IP packet to be intercepted and communicated to the packet interceptor device.

A plurality of proxy IP address assignment rules associated with host name resolution, hardcoded IP addresses, allocated IP addresses that instruct on assigning assigned IP addresses to client applications attempting to connect to a network resource. Authenticating the client application via an identity provider based on retrieving original destination data associated with the IP packet from a domain name system server. The local protocol server retrieves a source port of the IP packet corresponding to the translated IP packet, wherein the source port is mapped to original destination data of the translated IP packet. The local protocol server supports performing a plurality of network security operations on the data associated with the translated IP packets, wherein the network security operations comprise authorizing, auditing, or securing access to a network resource.

ADDITIONAL SUPPORT FOR DETAILED DESCRIPTION OF THE INVENTION

Example Distributed Computing System Environment

Figure 6:
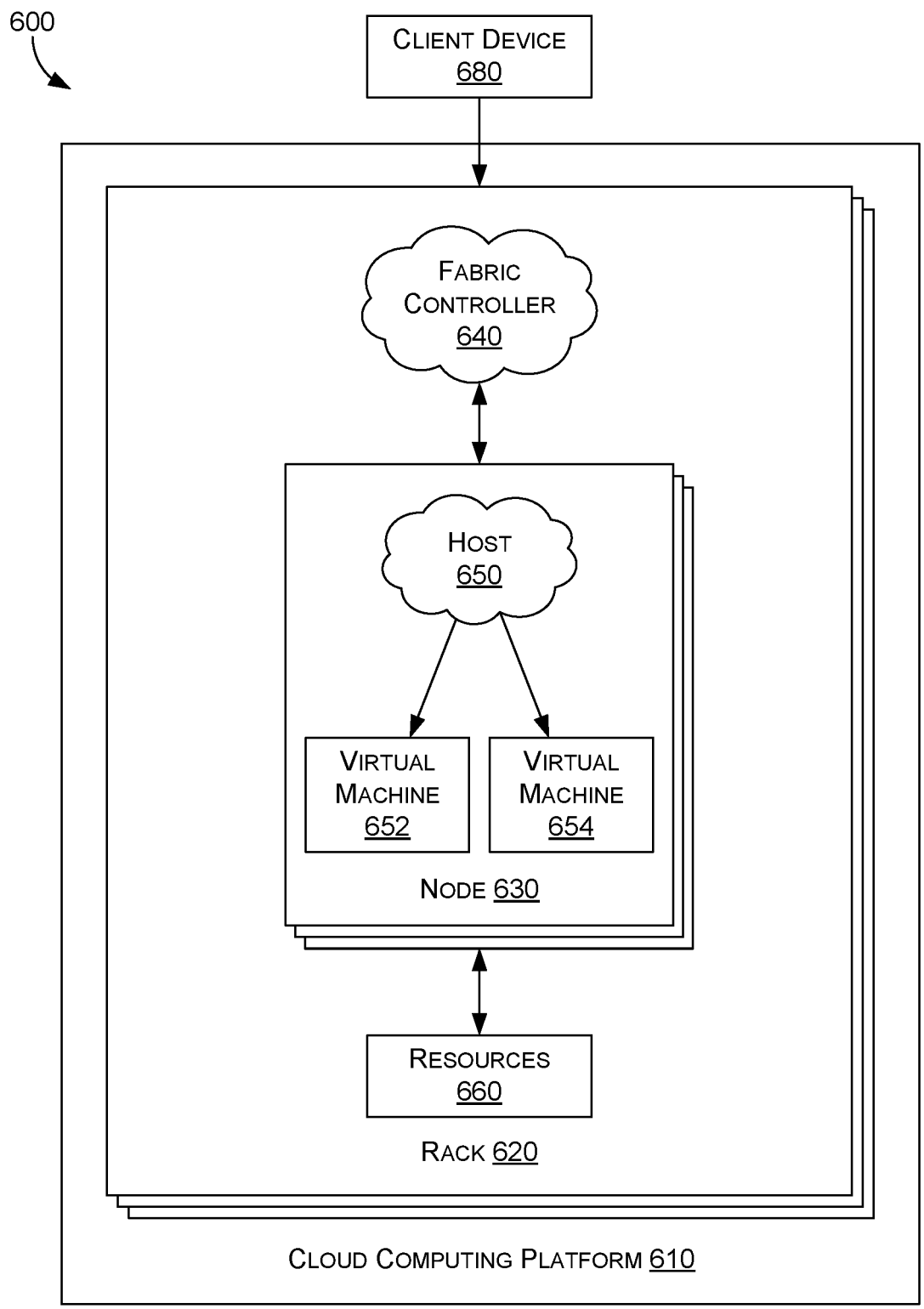
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Distributed Computing Environment

Having briefly described an overview of embodiments of the present invention, an example operating environment in which embodiments of the present invention may be implemented is described below in order to provide a general context for various aspects of the present invention. Referring initially to FIG. 6 in particular, an example operating environment for implementing embodiments of the present invention is shown and designated generally as computing device 600. Computing device 600 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 7:
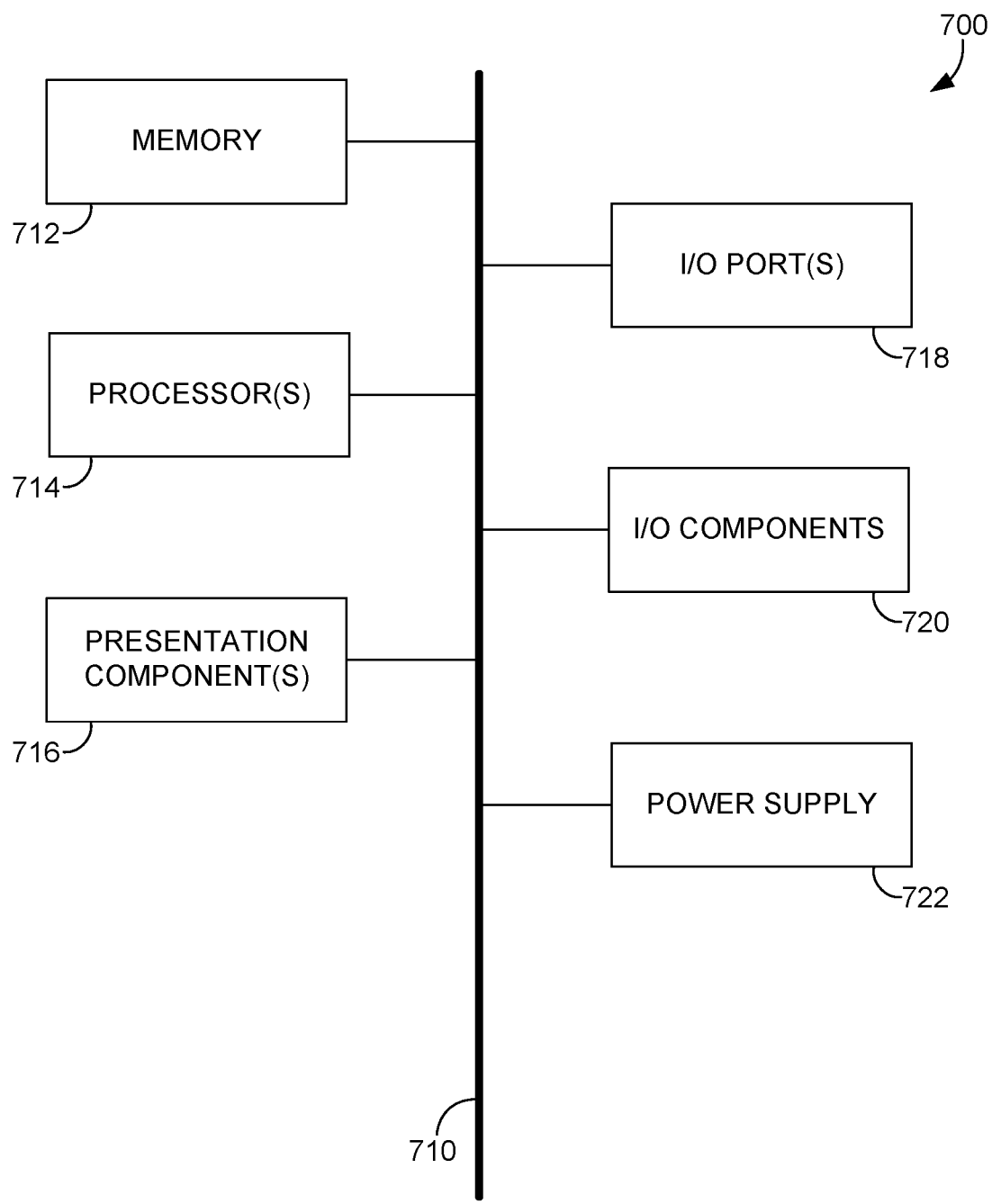
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations comprising:
access, at a destination network address translator on a client device, an Internet Protocol (IP) packet from a packet interceptor device, the IP packet is associated with both a client application on the client device and an assigned IP address of the packet interceptor device;
using a Destination Network Address Translation (DNAT) operation associated with client-side protocol server communication and port translation, translate a destination network address of the IP packet to a client-side forwarding IP address and port of a local protocol server on the client device; and
communicate the translated IP packet comprising the client-side forwarding IP address and port to an operating system routing mechanism, the client-side forwarding IP address and port cause the operating system routing mechanism to forward data associated with the translated IP packet to the local protocol server.

2. The system of claim 1, wherein the local protocol server comprises a socket associated with the client-side forwarding IP address and port, the local protocol server is configured to:
listen via the socket;
access the data associated with the translated IP packet;
based on accessing the data associated with the translated IP packet, establish a network connection with the client application, the network connection comprising a route from the client application to the local protocol server via the packet interceptor device and a destination network address translator, wherein establishing the network connection comprises the local protocol server and the client application performing a Transmission Control Protocol (TCP) three-way handshake.

3. The system of claim 2, wherein a synchronize/acknowledgement communication from the local protocol server and an acknowledgement communication from the client application are communicated via the packet interceptor device and the destination network address translator during the TCP three-way handshake to establish a network connection between the client application and the local protocol server.

4. The system of claim 1, wherein the local protocol server is further configured to retrieve a source port of the translated IP packet, wherein the source port is mapped to original destination data of the IP packet.

5. The system of claim 1, wherein the packet interceptor device is configured to receive IP packets that are intercepted based on a plurality of assigned IP addresses that cause intercepting the IP packets and routing the IP packets to the packet interceptor device.

6. The system of claim 1, the operations further comprising
routing the IP packet to the packet interceptor device based on the assigned IP address; and
communicating data associated with the translated IP packet to the local protocol sever based on the client-side forwarding IP address and port.

7. The system of claim 1, further comprising a plurality of proxy IP address assignment rules associated with host name resolution, hardcoded IP addresses, allocated IP addresses that instruct on assigning assigned IP addresses to client applications attempting to connect to a network resource.

8. One or more computer-storage media having computer-executable instructions embodied thereon that, when executed by a computing system having a processor and memory, cause the processor to:
access, at a destination network address translator on a client device, an Internet Protocol (IP) packet from a packet interceptor device, the IP packet is associated with both a client application on the client device and an assigned IP address of the packet interceptor device;
using a Destination Network Address Translation (DNAT) operation associated with client-side protocol server communication and port translation, translate a destination network address of the IP packet to a client-side forwarding IP address and port of a local protocol server on the client device; and
communicate the translated IP packet comprising the client-side forwarding IP address and port to an operating system routing mechanism, the client-side forwarding IP address and port cause the operating system routing mechanism to forward data associated with the translated IP packet to the local protocol server.

9. The media of claim 8, wherein the local protocol server comprises a socket associated with the client-side forwarding IP address and port, the local protocol server is configured to:
listen via the socket;
access the data associated with the translated IP packet;
based on accessing the data associated with the translated IP packet, establish a network connection with the client application, the network connection comprising a route from the client application to the local protocol server via the packet interceptor device and a destination network address translator, wherein establishing the network connection comprises the local protocol server and the client application performing a Transmission Control Protocol (TCP) three-way handshake.

10. The media of claim 9, wherein a synchronize/acknowledgement communication from the local protocol server and an acknowledgement communication from the client application are communicated via the packet interceptor device and the destination network address translator during the TCP three-way handshake to establish a network connection between the client application and the local protocol server.

11. The media of claim 8, wherein the local protocol server is further configured to retrieve a source port of the translated IP packet, wherein the source port is mapped to original destination data of the IP packet.

12. The media of claim 8, wherein the packet interceptor device is configured to receive IP packets that are intercepted based on a plurality of assigned IP addresses that cause intercepting the IP packets and routing the IP packets to the packet interceptor device.

13. The media of claim 8, the operations further comprising
routing the IP packet to the packet interceptor device based on the assigned IP address; and
communicating data associated with the translated IP packet to the local protocol sever based on the client-side forwarding IP address and port.

14. The media of claim 8, further comprising a plurality of proxy IP address assignment rules associated with host name resolution, hardcoded IP addresses, allocated IP addresses that instruct on assigning assigned IP addresses to client applications attempting to connect to a network resource.

15. A computer-implemented method, the method comprising:
accessing, at a destination network address translator on a client device, an Internet Protocol (IP) packet from a packet interceptor device, the IP packet is associated with both a client application on the client device and an assigned IP address of the packet interceptor device;
using a Destination Network Address Translation (DNAT) operation associated with client-side protocol server communication and port translation, translating a destination network address of the IP packet to a client-side forwarding IP address and port of a local protocol server on the client device; and
communicating the translated IP packet comprising the client-side forwarding IP address and port to an operating system routing mechanism, the client-side forwarding IP address and port cause the operating system routing mechanism to forward data associated with the translated IP packet to the local protocol server.

16. The method of claim 15, wherein the IP packet is received at the packet interceptor device based on the assigned IP address associated with the client application that causes the IP packet to be intercepted and communicated to the packet interceptor device.

17. The method of claim 15, the method further comprising a plurality of proxy IP address assignment rules associated with host name resolution, hardcoded IP addresses, allocated IP addresses that instruct on assigning assigned IP addresses to client applications attempting to connect to a network resource.

18. The method of claim 15, the method further comprising authenticating the client application via an identity provider based on retrieving original destination data associated with the IP packet from a domain name system server.

19. The method of claim 15, wherein the local protocol server retrieves a source port of the IP packet corresponding to the translated IP packet, wherein the source port is mapped to original destination data of the translated IP packet.

20. The method of claim 15, wherein the local protocol server supports performing a plurality of network security operations on the data associated with the translated IP packets, wherein the network security operations comprise authorizing, auditing, or securing access to a network resource.

* * * * *